(12) United States Patent
Kalev

(10) Patent No.: US 9,548,636 B2
(45) Date of Patent: Jan. 17, 2017

(54) ELECTROMECHANICAL FLYWHEEL CONTAINMENT SYSTEM

(71) Applicant: Claude Michael Kalev, Newbury Park, CA (US)

(72) Inventor: Claude Michael Kalev, Newbury Park, CA (US)

(73) Assignee: Rotonix Hong Kong Limited, Newbury Park, CA (US)

( * ) Notice: Subject to any disclaimer, the term of this patent is extended or adjusted under 35 U.S.C. 154(b) by 380 days.

(21) Appl. No.: 14/350,147

(22) PCT Filed: Dec. 21, 2012

(86) PCT No.: PCT/US2012/071507
§ 371 (c)(1),
(2) Date: Apr. 7, 2014

(87) PCT Pub. No.: WO2013/101781
PCT Pub. Date: Jul. 4, 2013

(65) Prior Publication Data
US 2014/0300224 A1     Oct. 9, 2014

Related U.S. Application Data

(60) Provisional application No. 61/582,332, filed on Dec. 31, 2011.

(51) Int. Cl.
| | | |
|---|---|---|
| *H02K 21/22* | (2006.01) | |
| *H02K 7/02* | (2006.01) | |
| *H02K 7/10* | (2006.01) | |
| *H02K 17/42* | (2006.01) | |
| *H02K 7/18* | (2006.01) | |
| *H02K 9/00* | (2006.01) | |
| *H02K 5/20* | (2006.01) | |
| *H02K 9/19* | (2006.01) | |
| *F16F 15/30* | (2006.01) | |

(52) U.S. Cl.
CPC ............. *H02K 7/025* (2013.01); *F16F 15/302* (2013.01); *H02K 5/20* (2013.01); *H02K 9/00* (2013.01); *H02K 9/19* (2013.01); *Y02E 60/16* (2013.01)

(58) Field of Classification Search
CPC .................................. H02K 7/00; H02K 7/18
USPC ................... 310/74, 77, 153, 168; 290/1 R
See application file for complete search history.

(56) References Cited

U.S. PATENT DOCUMENTS

| | | | | |
|---|---|---|---|---|
| 5,952,746 A | * | 9/1999 | Mittmann | H02K 7/00 310/12.31 |
| 6,624,542 B1 | * | 9/2003 | Gabrys | F16C 32/044 310/52 |
| 6,889,577 B2 | * | 5/2005 | Griswold | F16F 15/315 74/572.2 |

(Continued)

FOREIGN PATENT DOCUMENTS

| | | |
|---|---|---|
| CN | 102290965 A | 12/2011 |
| JP | 2004-194440 A | 7/2004 |

(Continued)

*Primary Examiner* — Jose Gonzalez Quinones
(74) *Attorney, Agent, or Firm* — Paul D. Chancellor; Ocean Law

(57) ABSTRACT

An electromechanical flywheel machine includes a multi-wall containment system used in connection with a motor-generator for exchanging energy with a flywheel mass.

4 Claims, 12 Drawing Sheets

(56) References Cited

U.S. PATENT DOCUMENTS

2009/0134705 A1* 5/2009 Kalev .................... H02K 7/025
                                                                 307/68

FOREIGN PATENT DOCUMENTS

| KR | 20-1999-0027839 U | 7/1999 |
| WO | 96-24981 A1 | 8/1996 |

* cited by examiner

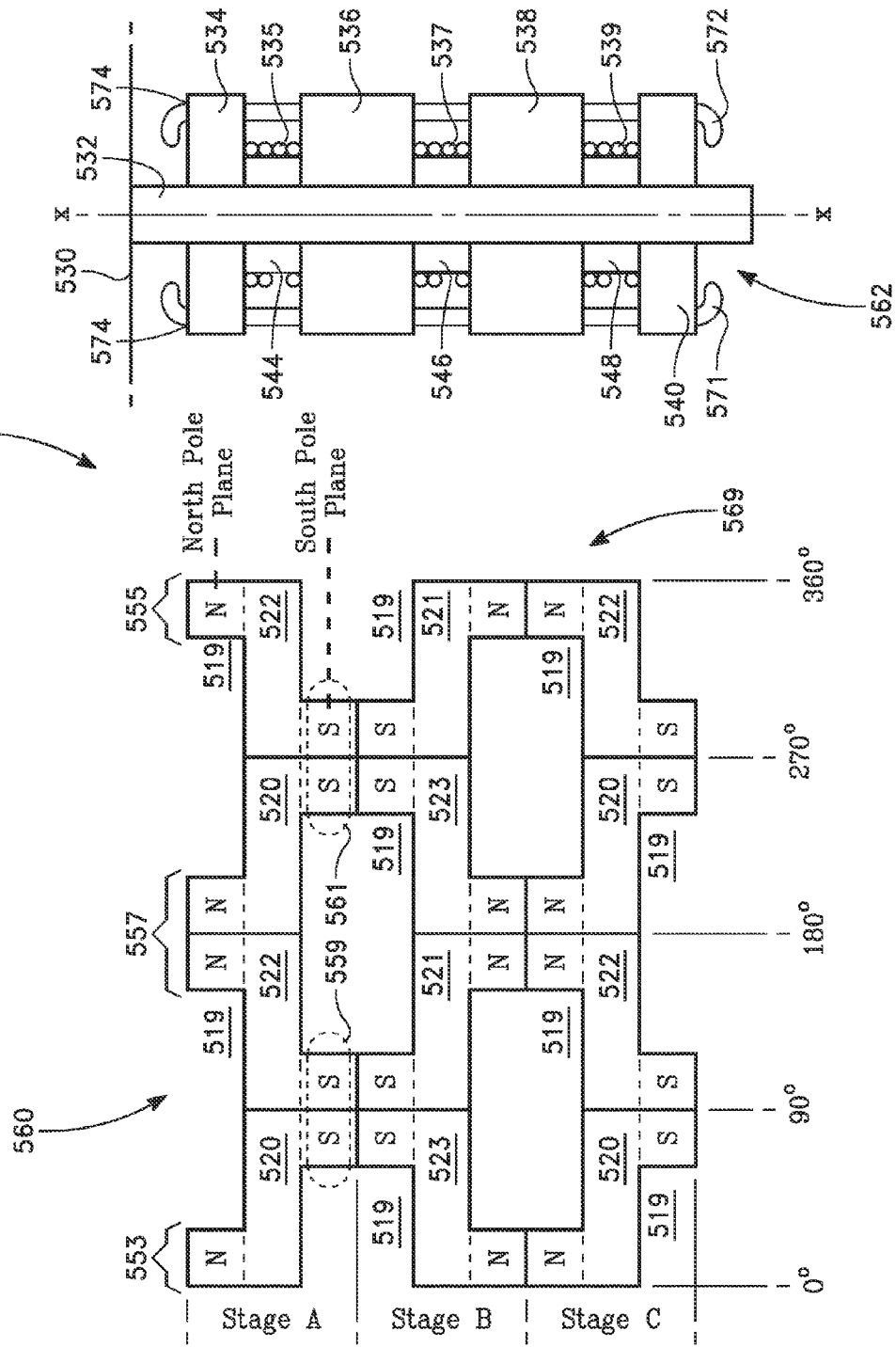

ELECTROMECHANICAL FLYWHEEL CONTAINMENT SYSTEM

PRIORITY CLAIM

This application claims the benefit of U.S. Prov. Pat. App. No. 61/582,332 filed Dec. 31, 2011 and entitled ELECTROMECHANICAL FLYWHEEL CONTAINMENT SYSTEM.

Known flywheels store kinetic energy, that is, the energy of motion. When called upon to release this energy, the flywheel slows as kinetic energy is depleted. Flywheels driving and driven by electric machines are also known. For decades, such electromechanical machines have been built and have achieved varying degrees of operational success. Widespread application has, however, eluded flywheel manufacturers as even the most advanced commercial machines suffer from significant operational limitations while exceeding the cost of better performing alternatives. Despite persistent efforts by a small flywheel manufacturing industry, modern electromechanical flywheels have found only narrow applications in a few niche markets and presently make no significant contribution to the developed world's energy supply.

BACKGROUND OF THE INVENTION

Known flywheels store kinetic energy, that is, the energy of motion. When called upon to release this energy, the flywheel slows as kinetic energy is depleted. Flywheels driving and driven by electric machines are also know. For decades, such electromechanical machines have been built and have achieved varying degrees of operational success. Widespread application has, however, eluded flywheel manufacturers as even the most advanced commercial machines suffer from significant operational limitations while exceeding the cost of better performing alternatives. Despite persistent efforts by a small flywheel manufacturing industry, modern electromechanical flywheels have found only narrow applications in a few niche markets and presently make no significant contribution to the developed world's energy supply.

Field of Invention

This invention relates to the electromechanical arts. In particular, evacuation, safety, heat transfer, and support functions of an electromechanical flywheel are enabled, at least in part, by a multi-wall containment system.

Discussion of the Related Art

Electromechanical flywheels include machines operating under atmospheric conditions and machines operating under evacuated conditions. While machines operating in evacuated environments have benefitted from high speed operation, they have also been limited by available techniques to manage magnetic part temperatures and safety containment.

SUMMARY OF THE INVENTION

The present invention provides an electromechanical flywheel having a rotor encircling a stationary stator and stator windings including a field winding encircling an axis of stator rotation.

In an embodiment, an electromechanical flywheel comprises a core assembly including a motor-generator stator; a motor generator rotor surrounding the stator; the stator defining an axis of rotation, having a field coil that encircles the axis of rotation, and having an armature coil that does not encircle the axis of rotation; a flywheel mass encircles the rotor and is coupled to the rotor for rotation with the rotor; and, an evacuable housing that encloses the flywheel mass. The rotor is supported by first and second spaced apart suspension assemblies; the first suspension assembly includes a first electromagnetic bearing for applying centering and levitating forces to the rotor; and, the second suspension assembly includes a second electromagnetic bearing for applying centering forces to the rotor.

In an embodiment, an electromechanical flywheel containment system comprises: inner and outer enclosures defining respective inner and outer walls; a projectile shield between the walls of the inner and outer enclosures; an energy exchange block including a core assembly including a motor-generator stator and a stator support and a spinning assembly including a motor-generator rotor, a flywheel mass and a hub; the motor-generator rotor surrounding the motor-generator stator; the inner enclosure enveloping the energy exchange block; the outer enclosure enveloping the inner enclosure; a first annular flow passage for transporting a fluid coolant, the first annular flow passage outer diameter bounded by a wall of the outer enclosure; and, wherein a containment system fluid circuit for transporting coolant includes the first annular flow passage and a stator support flow passage.

In an embodiment, the electromechanical flywheel containment system above further comprises: the inner and outer walls of the inner and outer enclosures concentrically arranged; the projectile shield encircling the inner wall; a shroud encircling the projectile shield; the shroud encircled by the outer wall of the outer enclosure; the first annular flow passage inner diameter bounded by the shroud; a second annular flow passage bounded by the shroud and the projectile shield; and, wherein the containment system fluid circuit for transporting coolant includes the second annular flow passage.

In yet another embodiment, an electromechanical flywheel containment system comprises: inner and outer enclosures defining respective inner and outer walls: a projectile shield between the inner and outer walls; an annular flow passage for transporting a fluid coolant; the annular flow passage inner diameter bounded by the projectile shield; a motor-generator stator hanging from the inner enclosure; a rotating assembly including a motor-generator rotor, defining an axis of rotation, and encircling a motor-generator stator and defining an axis of rotation; a flywheel mass surrounding and coupled to the rotor; and, wherein a field winding of the stator encircles the axis of rotation and an armature winding of the stator does not encircle the axis of rotation.

BRIEF DESCRIPTION OF THE DRAWINGS

The present invention is described with reference to the accompanying figures. These figures, incorporated herein and forming part of the specification, illustrate the present invention and, together with the description, further serve to explain the principles of the invention and to enable a person skilled in the relevant art to make and use the invention.

FIG. 5B shows rotor poles and a stator of an electromechanical flywheel machine of FIG. 1.

DETAILED DESCRIPTION OF THE PREFERRED EMBODIMENTS

The disclosure provided in the following pages describes examples of some embodiments of the invention. The designs, figures, and descriptions are non-limiting examples of certain embodiments of the invention. For example, other embodiments of the disclosed device may or may not include the features described herein. Moreover, disclosed advantages and benefits may apply to only certain embodiments of the invention and should not be used to limit the disclosed inventions.

Figure 1:
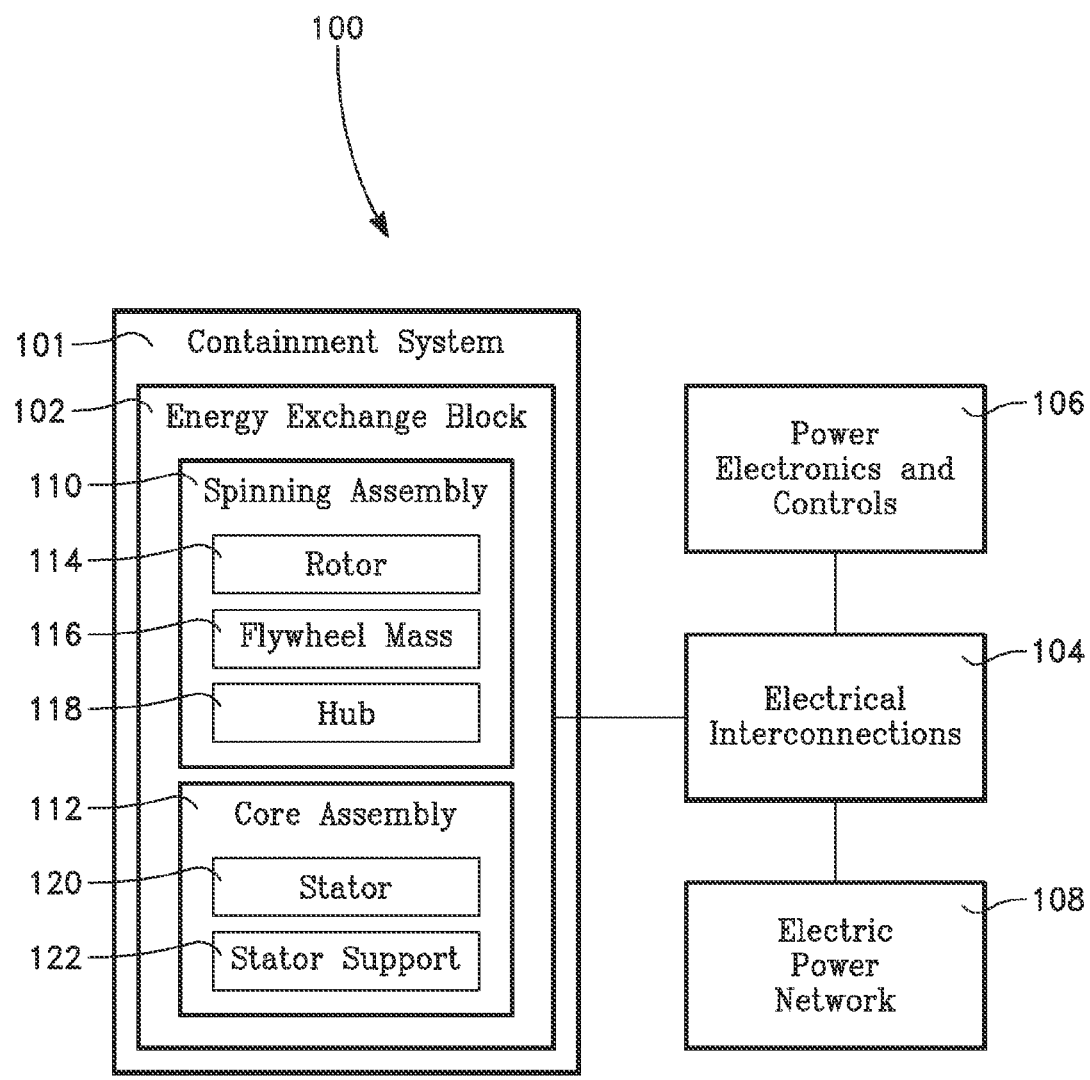
FIG. 1 shows a block diagram of an electromechanical flywheel machine in accordance with the present invention.

FIG. 1 shows an electromechanical flywheel machine 100. Electrical interconnections 104 electrically couple an energy exchange block 102, power electronics and controls 106, and an electric power network 108.

As used herein, unless otherwise stated, the term coupled refers to a direct or indirect connection such as A connected directly to B and C connected indirectly to E via D.

The energy exchange block 102 includes a spinning assembly 110 and a core assembly 112. A containment system 101 provides one or more containment features discussed below. The spinning assembly includes a motor-generator rotor 114, a flywheel mass 116, and a hub 118. The core assembly includes a motor-generator stator 120 and a motor-generator stator support 122. In various embodiments, the spinning assembly is, as shown here, shaft-less.

Electrical interconnections 104 include any of electrical conductor connections, electrical interface devices, electrical transducers, and the like. Power electronics and controls 106 include any of silicon and/or semiconductor devices, analog and digital processors, and related interfaces including human interfaces. The electric power network 108 is 1) a source of electric power to the energy exchange block 102 in some embodiments, 2) a user of electric power from the energy exchange block in some embodiments, and 3) both a source and a user of electric power to and from the energy exchange block in some embodiments.

Figure 2:
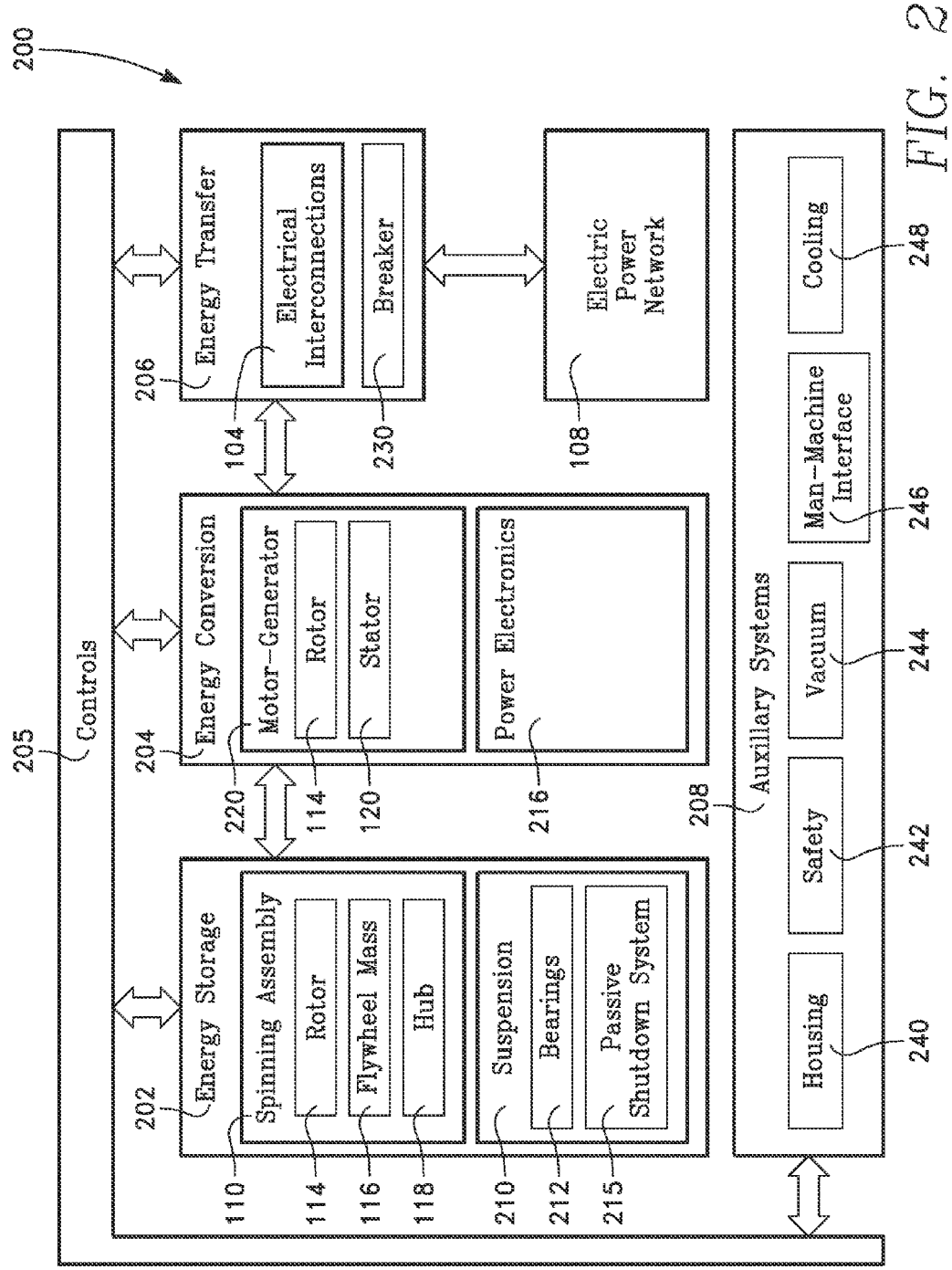
FIG. 2 shows selected functions and equipment of the electromechanical flywheel machine of FIG. 1.

FIG. 2 shows selected electromechanical flywheel machine functions and equipment 200. Energy storage 202 is central to flywheel operation. In electromechanical flywheels, energy storage and energy conversion 204 provide a means for converting kinetic energy to electrical power and/or converting electrical power to kinetic energy. Energy transfer 206 provides for electric power transfers between energy conversion equipment 220, 216 and an electric power network 108. In various embodiments, an electrical switch such as a circuit breaker 230 provides for connecting and disconnecting conductors enabling power transfer. In various embodiments, other electromechanical flywheel machine functions include any of several auxiliary support functions 208 described below.

Energy storage 202 utilizes the spinning assembly 110. In various embodiments, a suspension system 210 supports the spinning assembly. Suspension equipment includes bearings or their equivalents 212 and in some embodiments a passive shutdown system 215 supports the spinning assembly in selected operating regimes such as shutdown.

Energy conversion 204 utilizes a means for converting kinetic energy into electrical power such as a generator or a motor-generator. A motor-generator 220 is shown. The motor-generator includes the rotor 114 and a stator 120 and provides a means for rotatably driving the spinning assembly 110 and for being rotatably driven by the spinning assembly. In various embodiments, power electronics 216 enable manipulation of electrical waveforms emanating from the motor-generator and/or the electric power network 108. For example, in various embodiments, power electronics provide for frequency conversion in an AC to AC converter having an intermediate DC bus and power electronics provide for variable speed drive functions such as accelerating the flywheel rotor.

In various embodiments, auxiliary support functions 208 are carried out by auxiliary support equipment described more fully below. Auxiliary support functions include housing 240, safety 242, vacuum 244, cooling 248, and man-machine interface 246.

A control function 205 provides for one or more of monitoring, assessment, command, and control of other electromechanical flywheel functions. In particular, the control function enables electromechanical flywheel operation via supervision and/or control of one or more of the energy storage 202, energy conversion 204, energy transfer 206, and auxiliary support 208 functions.

Figure 3:
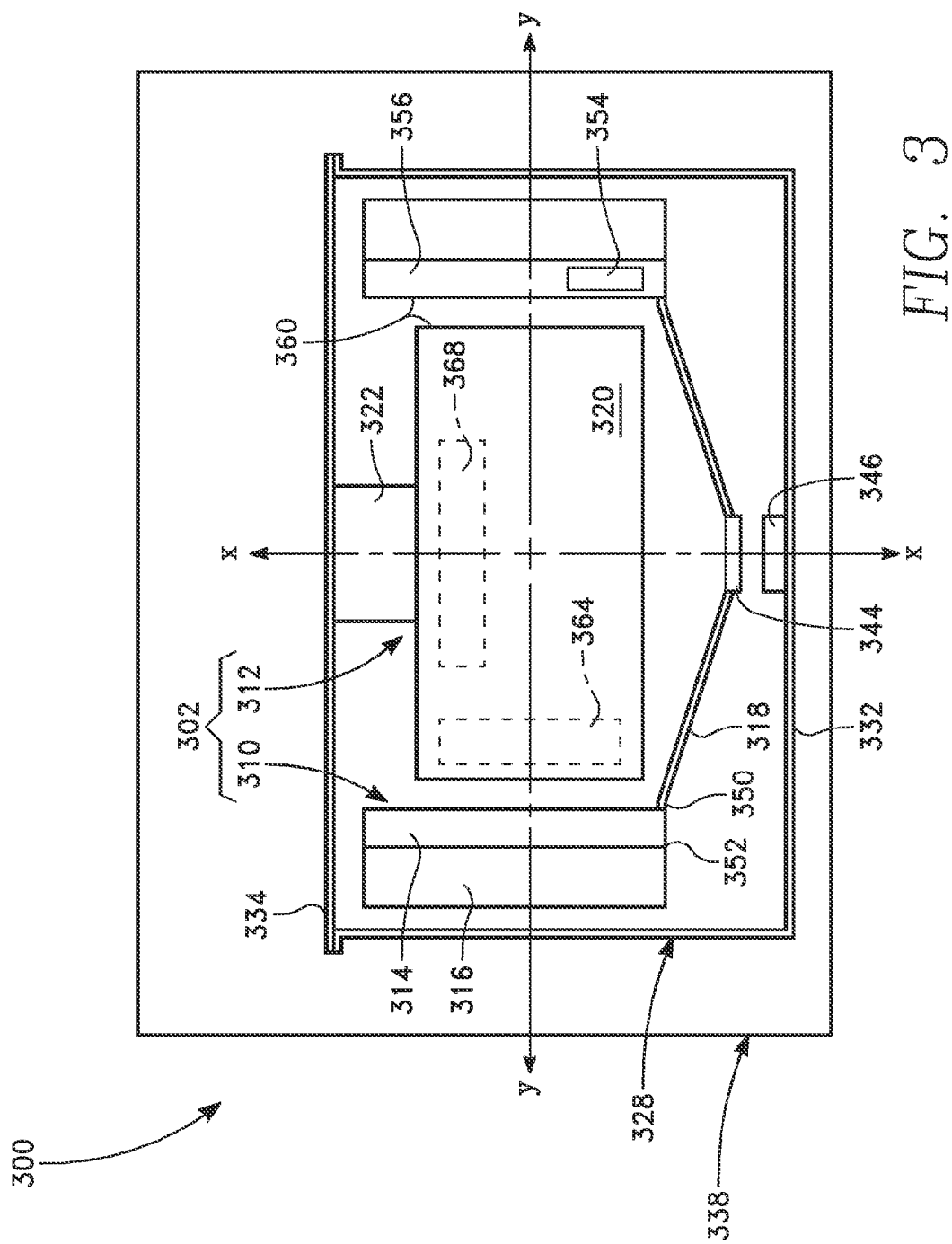
FIG. 3 shows a first embodiment of the electromechanical flywheel machine of FIG. 1.

FIG. 3 shows a first electromechanical flywheel portion 300. An energy exchange block 302 is enclosed by an inner housing 328 which is in turn enclosed by an optional outer housing 338.

The energy exchange block 302 includes a spinning assembly 310 and a core assembly 312. Included in the spinning assembly is a motor-generator rotor 314, a flywheel mass encircling and coupled to the rotor 316, a hub 318 coupled to the flywheel mass, and a moving suspension element 344. In some embodiments, a sleeve such as a non-magnetic sleeve is interposed between the rotor and the flywheel mass for, inter alfa, backing the rotor and providing support to the rotor. The rotor, flywheel mass, hub, and moving suspension element are for rotation in synchrony about an axis x-x and in various embodiments the hub is attached to one or both of the rotor 350 and the flywheel mass 352. Opposite the moving suspension element is a stationary suspension element 346 supported via a first wall of the inner housing 332. Included in the core assembly 312 are a stator 320 and a stator support 322. In some embodiments, the stator support is coupled to a wall of the inner housing such as a second wall of the inner housing 334.

Encircling the motor-generator stator 320 is the motor-generator rotor 314. In various embodiments, the rotor 314 includes magnetic 354 and nonmagnetic 356 portions and, in some embodiments, the nonmagnetic portion is or includes blocking or matrix material supporting the magnetic portions. In an embodiment, the magnetic rotor portions are laminated structures.

In various embodiments, the stator 320 includes a magnetic structure with one or more interengaged coils having electrically conductive windings capable of carrying variable currents and thereby varying the magnetic flux of the magnetic structure. In some embodiments, a first stator coil 364 encircles an imaginary y-y axis that is about perpendicular to the x-x axis. And, in some embodiments, a second stator coil 368 encircles the x-x axis. In an embodiment, a plurality of first stator coils encircle respective imaginary y-y axes and one or more second stator coils encircle the x-x axis, the first stator coils being armature coils and the second stator coils being field coils.

And, in an embodiment, the motor-generator 360 is a homopolar device with the illustrated inside-out arrangement (rotor encircles stator) wherein a) a rotatable rotor similar to rotor 314 includes coil-less, laminated magnetic structures, b) wherein a stationary central stator similar to stator 320 includes laminated magnetic structures with coils for creating a magnetic flux in the magnetic structures and c) the rotor encircles the stator.

Figure 4:
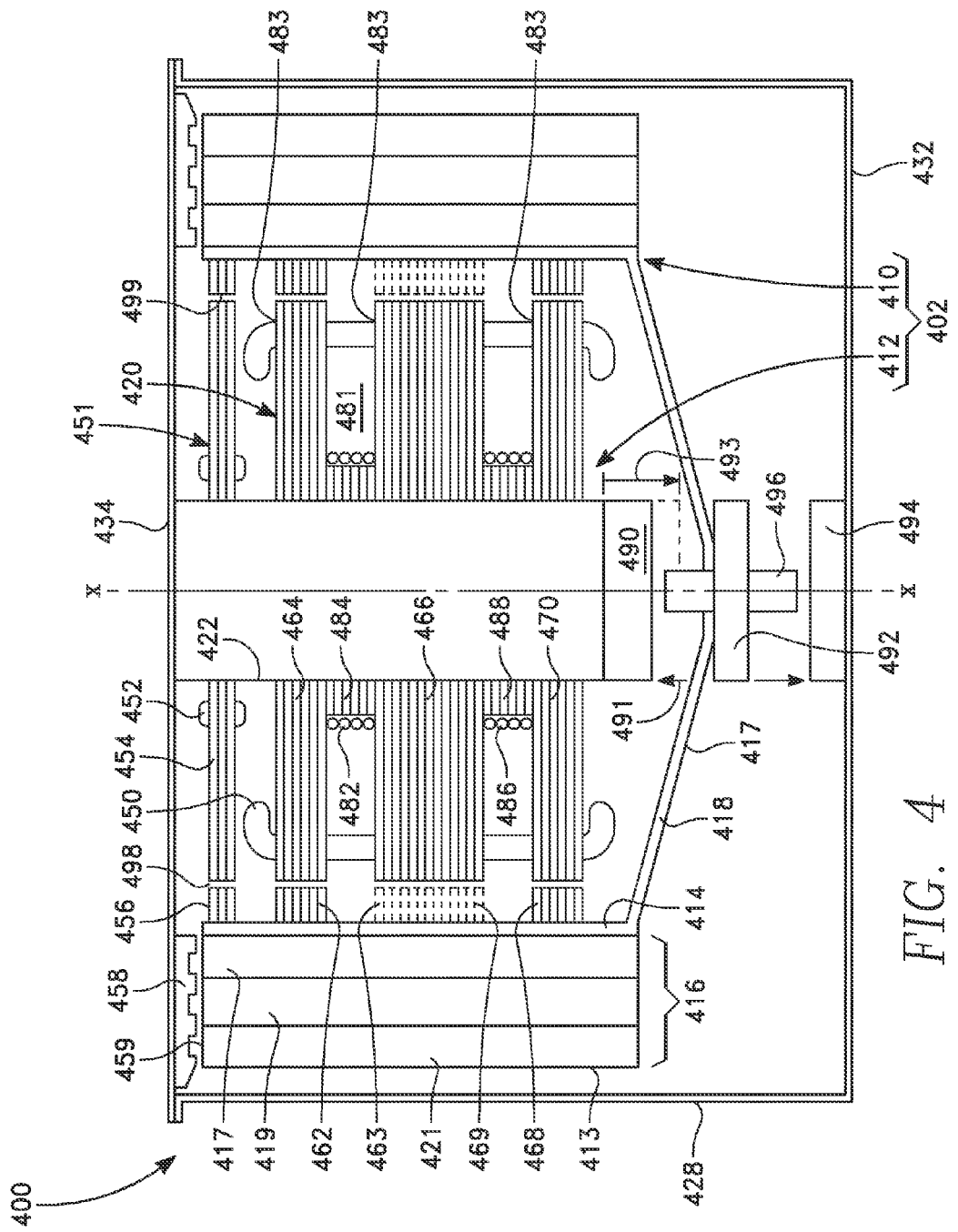
FIG. 4 shows a second embodiment of the electromechanical flywheel machine of FIG. 1.

FIG. 4 shows a second electromechanical flywheel portion 400. An energy exchange block 402 is enclosed by an inner housing 428 which is enclosed, or partially enclosed, in some embodiments, by an outer housing (not shown).

The energy exchange block 402 includes a spinning assembly 410 and a core assembly 412. Included in the spinning assembly are a motor-generator rotor 414, a flywheel mass encircling and coupled to the rotor 416, a hub coupled to the flywheel mass 418, a support pin for supporting the hub 496, and a moving suspension assembly for supporting the hub 492. Some embodiments include a sleeve such as a non-magnetic sleeve between the rotor and the flywheel mass.

In various embodiments, the flywheel mass 416 includes layers of different materials such as fiberglass in one or more types or grades and carbon fiber in one or more types or grades. U.S. Pat. No. 6,175,172 entitled HUB AND CYLINDER DESIGN FOR FLYWHEEL SYSTEM FOR MOBILE ENERGY STORAGE is incorporated by reference herein in its entirety and for all purposes including flywheel mass construction techniques and materials.

As shown, the flywheel mass includes three layers with a first layer 417 adjacent to the rotor, an intermediate layer 419, and an outer layer 421. In an embodiment, the intermediate and outer layers include carbon fiber materials and the inner layer includes fiberglass. In another embodiment, all three layers are substantially made from carbon fiber materials. In various embodiments, one or more layers are pre-stressed such as by winding fibers under tension to form substantially cylindrical shell(s) with inherent compressive stress.

The support pin, moving suspension assembly and hub are concentrically arranged and are for rotation in synchrony about an axis x-x. As seen, the support pin 496 is located in a gap 491 between upper and lower bearing carriers 490, 494. Extending from the stator support 422 is an upper bearing carrier and supported from a first wall of the housing 432 is a lower bearing carrier. In an embodiment, elongation of the upper bearing carrier along the x-x axis 493 serves to rotatably restrain the support pin between the upper and lower bearing carriers. In this sense, the upper and lower bearing carriers provide a means to "capture" the spinning assembly 410 via the support pin and are useful for functions including passive shutdown. In various embodiments, the lower bearing carrier and the moving suspension assembly incorporate a first electromagnetic bearing.

A second electromagnetic bearing 451 is spaced apart from the upper and lower bearing carriers 490, 494. The second electromagnetic bearing includes a fixed bearing stator 454 supported by the stator support 422 and electrical windings 452 for magnetizing the stator and a geometrically opposing rotor 456 coupled to the rotor. As shown, the mating faces of the electromagnet 498, 499 are parallel to the x-x axis such that electromagnetic bearing forces are perpendicular to the x-x axis. In other embodiments, angled electromagnetic bearing faces such as those described above provide electromagnetic bearing force components along an axis parallel to the x-x axis and along an axis perpendicular to the x-x axis.

Included in the core assembly 412 is a stator 420 and a stator support 422 coupled to a second wall of the inner housing 434. Encircling the motor-generator stator is the motor-generator rotor 414. In various embodiments, the rotor includes magnetic and nonmagnetic portions (e.g., see 354, 356 of FIG. 3) and, in some embodiments, the nonmagnetic portion is or includes blocking or matrix material supporting the magnetic portions. In an embodiment, the magnetic rotor portions are laminated structures.

In various embodiments, the stator 420 includes a magnetic structure with one or more interengaged coils having electrically conductive windings capable of carrying variable currents and thereby varying the magnetic flux of the magnetic structure.

A typical homopolar stator includes at least two peripheral rims and one smaller intermediate rim. The rims include a magnetic material such as iron and in various embodiments the rims are laminated structures with each laminate having a substantially annular shape.

As shown, the stator 420 includes three large diameter rims 464, 466, 470 and two smaller diameter rims 484, 488 such that substantially annular or somewhat doughnut shaped pockets 481 are formed between the large diameter and the small diameter rims. It is in these pockets that coils encircling the rotational axis x-x are placed to form field windings 482, 486. In addition to the field coil(s), the stator also includes armature coils.

Armature coils 450 are interengaged with slots 483 in the periphery of the large rims 464, 466, 470 such that each armature coil will encircle an imaginary axis y-y that is substantially perpendicular to the axis of rotation x-x (see FIG. 3).

For each stator rim, there is a plurality of mating rotor poles. As can be seen, the peripheral stator rims 464, 470 have axially spaced (x-x) mating rotor pole 462, 468 (shown in solid lines) and the central stator rim 466 has axially adjacent mating rotor poles 463, 469 (shown in broken lines). Rotor poles for adjacent rims (e.g., 462, 463) are not only axially spaced (x-x), but they are also radially spaced such that a rotor pole for one rim is radially spaced by 90 electrical degrees from the closest rotor pole mating with an adjacent rim.

In various embodiments, internal vacuum pumps such as molecular drag pumps provide for moving molecules away from the flywheel mass 416 and especially away from the flywheel mass periphery where the highest speeds are achieved. U.S. Pat. No. 5,462,402 FLYWHEEL WITH MOLECULAR PUMP is incorporated by reference herein in its entirety and for all purposes including its discussion of molecular drag pumps and their incorporation into flywheel systems.

In an embodiment, a first vacuum pump is formed by a stationary labyrinth like ring 458 supported from the housing wall 434 which is closely spaced with respect to a vacuum pump surface of the flywheel mass 459. In various embodiments grooves in the labyrinth ring provide for a pumping action in concert with the moving flywheel surface. In some embodiments, the groove is a spiral having a cross-sectional area that generally decreases along a forward flow path. And, in some embodiments, a second vacuum pump is formed by a labyrinth similar to the one described above and fixed to peripheral stator parts (such as the large diameter stator rings 454, 464, 466, 470, not shown for clarity) or fixed to geometrically opposed rotor poles (456, 462, 463, 469, 468).

In an embodiment, a supply region and an exhaust region are included within the evacuable housing. The supply region has a boundary defined at least in part by portions of a housing 428, a hub exterior surface 417, and a flywheel mass periphery 413. The exhaust region has a boundary defined at least in part by portions of the vacuum barrier housing and the core assembly 412. A first drag pump is interposed between a flywheel mass surface 459 and the vacuum barrier housing wall 434 and a second drag pump is interposed between at least one stator ring 466 and the rotor 414.

Figure 5A:
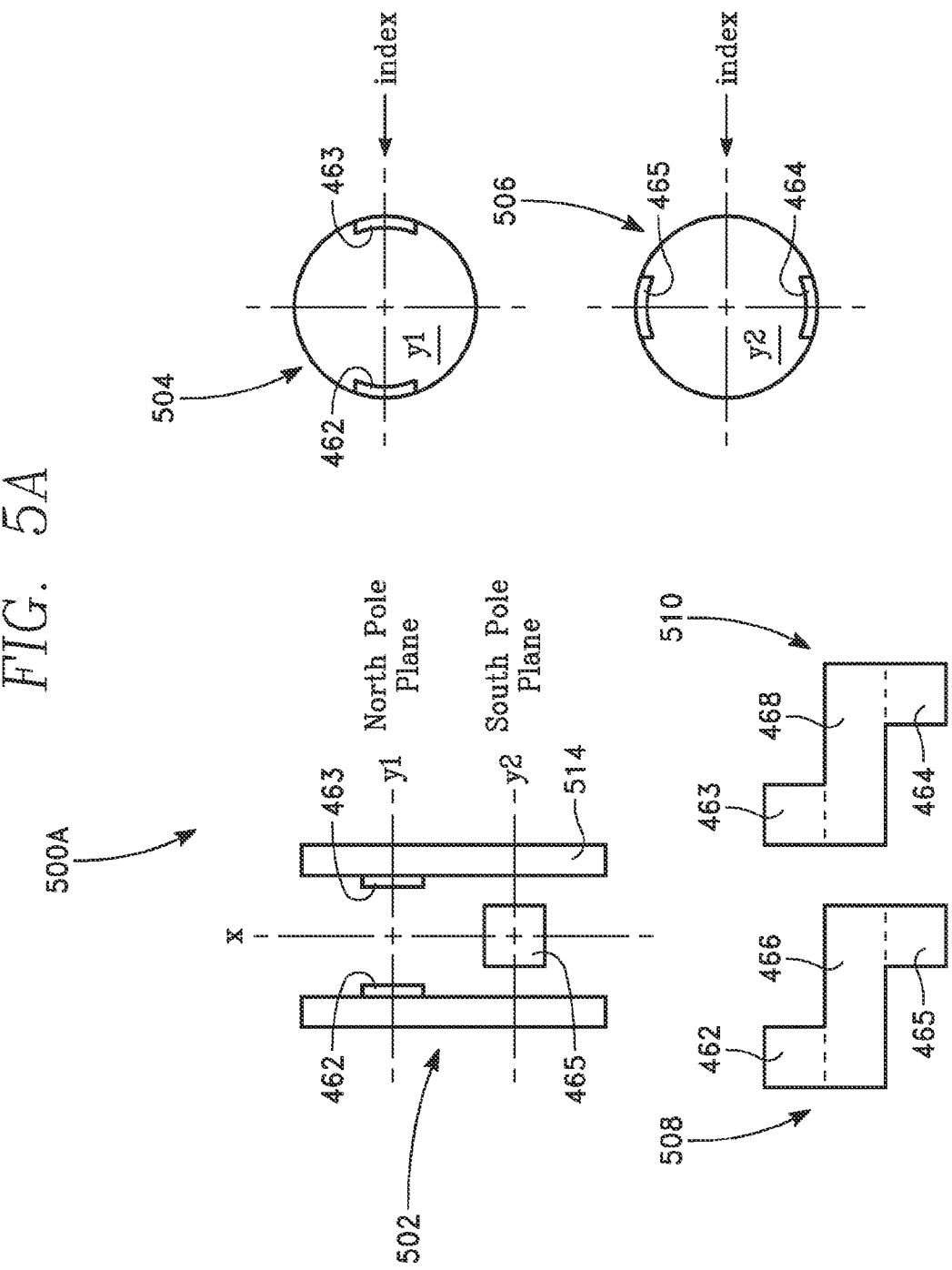
FIG. 5A shows rotor poles of an electromechanical flywheel machine of FIG. 1.

FIG. 5A shows a radially staggered arrangement of rotor poles in adjacent pole planes for a 2+2 pole single stage homopolar machine 500A. Referring to rotor cross section 502 and rotor 514, a first pole 462 is located in a first pole plane Y1 and an opposed pole 463 in located in the same plane. In a similarly clocked adjacent pole plane Y2, an adjacent plane pole 465 is between the Y1 plane poles. Not shown in this cross section is the second pole in the Y2 plane 464.

The plane views 504, 506 of the pole planes Y1, Y2 show the poles in each pole plane 462, 463 and 464, 465 are separated by a 90° geometric angle. In this four pole embodiment, the poles are similarly separated by 90 electrical degrees.

In various embodiments, a magnetic path extends between adjacent staggered poles. For example, as shown in the pole assemblies 508, 510, magnetic path parts 466, 468 extend between pole pairs 462, 463 and 463, 464. As shown here, two continuous magnetic paths are formed in a four pole machine rotor by magnetic path parts 462-466-465 and 463-468-464. In some embodiments, each magnetic path part assembly 462-466-465 and 463-468-464 is "Z" shaped with the central members 466, 468 meeting adjoining members 462, 465 and 465, 464 at substantially right angles. Among other things, this structure preserves the capacity of the magnetic path.

FIG. 5B shows a rotor and a stator for a three stage machine, each stage having four poles 500B. Here, a view of rotor magnetic path part assemblies 560 is shown as if the normally cylindrical rotor structure is "unrolled" such that a planar surface is presented. The magnetic path part assemblies 520, 522, 523, 521 are arranged to create a lattice 569 with spaces between the parts 519, the spaces being filled, in various embodiments, with non-magnetic material(s).

The lattice 569 is constructed such that a plurality of stages A, B, C is formed, each stage having four poles. For example, stage A has a North plane with a first full pole 557 and a second pole consisting of two half-poles 553, 555. Stage A also has a South plane with two full poles 559, 560. The North and South planes of Stage A therefore have a total of four complete poles.

Each stage includes four magnetic path part assemblies or rotor lattice parts. For example, Stage A includes magnetic path part assemblies 520, 522, 520, and 522; Stage B includes magnetic path part assemblies 523, 521, 523, and 521; and Stage C, like Stage A, includes magnetic path part assemblies 520, 522, 520 and 522. Notably, in various embodiments, the path part assemblies differ only in their orientation; for example, assembly 520 differs from assembly 522 by an 180° rotation about an axis parallel to the x-x axis while assembly 520 differs from assembly 523 by an 180° rotation about an axis perpendicular to the x-x axis. Assembly 522 differs from assembly 521 by an 180° rotation about an axis perpendicular to the x-x axis.

Also shown is a cross sectional view of a stator 562. As seen, the stator has large 534, 536, 538, 540 and small 544, 546, 548 diameter rims centered on an x-x axis. First and second large diameter intermediate rims 536, 538 are interposed between large diameter peripheral rims 534, 540. One small diameter rim is interposed between each pair of large diameter rims such that the rims are stacked in an order 534, 544, 536, 546, 538, 548, and 540. The rims are supported by a coupled stator support 532 that is supported via a wall 530.

A plurality of armature windings, for example 571, 572 interengage a plurality of the large diameter rim peripheries, for example 574 via slots or a similar feature. Field windings 535, 537, 539 encircle the stator axis of rotation x-x with one field winding encircling each of the small diameter rims such that each field winding is between a pair of large diameter rims.

As can be seen, the lattice structure of the rotor 569 is arranged such that the first rim of the stator 534 corresponds to the North poles of stage A; the third rim of the stator 536 corresponds to the South poles of stage A and the South poles of stage B; the fifth rim of the stator corresponds to the North poles of stage B and the North poles of stage C; and, the seventh rim of the stator corresponds to the South poles of stage C.

In various embodiments, bearings are used to support the spinning assembly and the included flywheel mass 116, 316, 416. Any combination of the bearings described herein that is sufficient to support the spinning assembly may be used.

Figure 6:
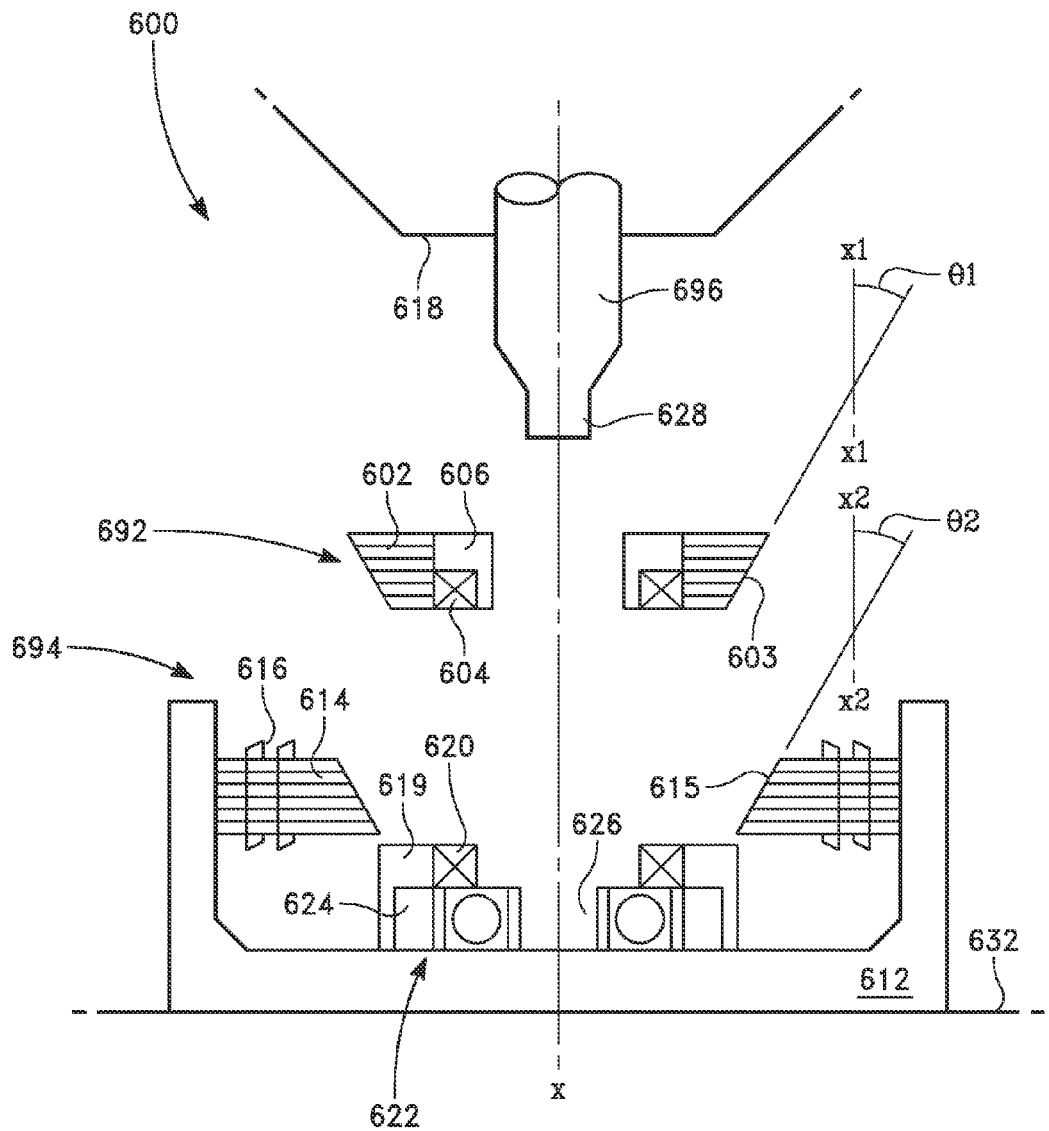
FIG. 6 shows a lower bearing assembly and some related parts of an electromechanical flywheel machine of FIG. 1.

FIG. 6 shows a lower bearing carrier and some related parts 600. As shown in the upper half of the drawing, there is a hub 618 for coupling to a flywheel mass, a support pin 696 for supporting the hub 618, a moving suspension assembly for supporting the hub 692, and a lower bearing carrier 694. The hub, support pin, and moving suspension assembly are fixedly coupled together (shown in FIG. 6 in exploded diagram format for clarity).

In various embodiments, the moving suspension assembly 692 includes a moving suspension assembly electromagnetic bearing rotor 602. In some embodiments, the bearing rotor is a laminated structure (as shown). In some embodiments, the bearing has a moving suspension assembly electromagnetic bearing face 603 oriented at an angle $\theta1=0°$ where the angle is defined by the face and an axis x1-x1 parallel to the x-x axis. And, in some embodiments, the bearing has a face 603 oriented at an angle $0<\theta1<90°$ ("angled face") (as shown) providing electromagnetic bearing force components parallel to the x-x axis and parallel to an axis perpendicular to the x-x axis.

In various embodiments, the moving suspension assembly 692 includes a moving suspension assembly permanent magnet 604 and in some embodiments the permanent magnet is in addition to the electromagnetic bearing rotor 602. And, in some embodiments, a moving suspension assembly magnet holder 606 provides a holder for either or both of the moving suspension assembly electromagnetic bearing rotor and the moving suspension assembly permanent magnet.

When the moving suspension assembly includes an electromagnetic bearing rotor 602, the lower bearing carrier 694 includes a corresponding lower bearing carrier electromagnetic bearing stator 614 and a lower bearing carrier stator electrical coil 616 for magnetizing the stator. The stator is supported by a lower bearing carrier frame 612 which is in turn supported by a housing wall 632.

In some embodiments, the bearing stator is a laminated structure (as shown). In some embodiments, the bearing has a lower bearing carrier electromagnetic bearing face 615 oriented at an angle θ2=0° where the angle is defined by the face and an axis x2-x2 parallel to the x-x axis. And, in some embodiments, the bearing has a face 615 oriented at an angle 0<θ2<90° ("angled face") (as shown) providing electromagnetic bearing magnetic force components parallel to the x-x axis and parallel to an axis perpendicular to the x-x axis. As will be appreciated by persons of ordinary skill in the art, the bearing faces 603, 615 interoperate such that a straight rotor face is matched with a straight stator face while an angled rotor face is matched with an angled rotor face.

Where a moving suspension assembly permanent magnet is used 604, the lower bearing carrier includes a geometrically opposed permanent magnet 620. In some embodiments, a lower bearing carrier permanent magnet holder 619 supported from the lower bearing carrier frame 612 and supporting the permanent magnet.

In various embodiments, the lower bearing carrier 694 includes a lower bearing carrier landing bearing such as an antifriction bearing 622. As shown, the landing bearing is supported from the lower bearing carrier frame 612. In some embodiments, a damping material 624 provides a seating material for the landing bearing.

Figure 7:
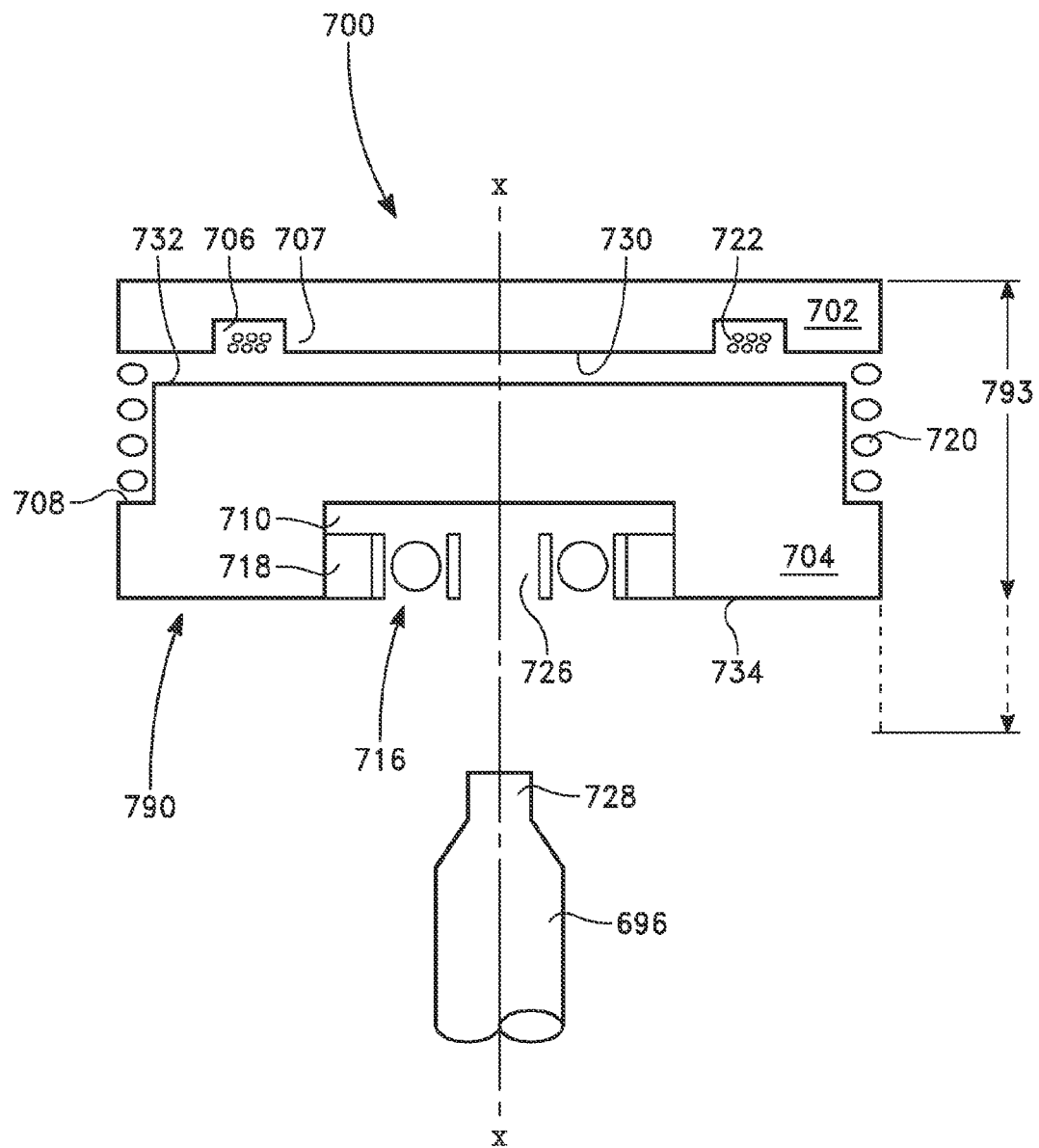
FIG. 7 shows an upper bearing assembly and some related parts of an electromechanical flywheel machine of FIG. 1.

FIG. 7 shows an upper bearing carrier and some related parts 700. As shown, the upper bearing carrier 790 includes a stationary plate 702 and a moving plate 704.

The stationary plate 702 includes a coil space 706 in the form of a groove is on a side of the stationary plate facing the moving plate 730. An electrical coil 722 for magnetizing a magnetic material surrounded by the coil 707 is included.

The moving plate 704 includes a spring space 708 and a mechanical bearing space 710. The spring space 708 is formed where a reduced diameter section of the moving plate extends to the side of the plate facing the stationary plate 732 and a spring such as a coil spring 720 occupies this space. The bearing space 710 is a central cavity in a moving plate surface 734 opposite the moving plate surface facing the stationary plate 732. As seen, operation of this electromagnet compresses the spring and tends to draw the plates together.

In various embodiments, the upper bearing carrier 790 includes an upper bearing carrier landing bearing such as an antifriction bearing 716. As shown, the landing bearing is positioned in the moving plate cavity 710. In some embodiments, a damping material 718 provides a seating material for the landing bearing.

As seen in FIGS. 6 and 7, the support pin 696 extends between the upper bearing carrier 790 and the lower bearing carrier 694. Further, each of the upper bearing carrier landing bearing 716, support pin 696, moving suspension assembly 692, lower electromagnetic bearing stator 614, lower bearing carrier permanent magnet 620, and lower bearing carrier landing bearing 622 is centered on the x-x axis such that when the moving plate 704 moves toward the lower bearing carrier 793, the support pin upper and lower ends 728, 628 are engaged with respective upper and lower landing bearings 716, 622 and a central aperture of each landing bearing 726, 626.

Figure 8:
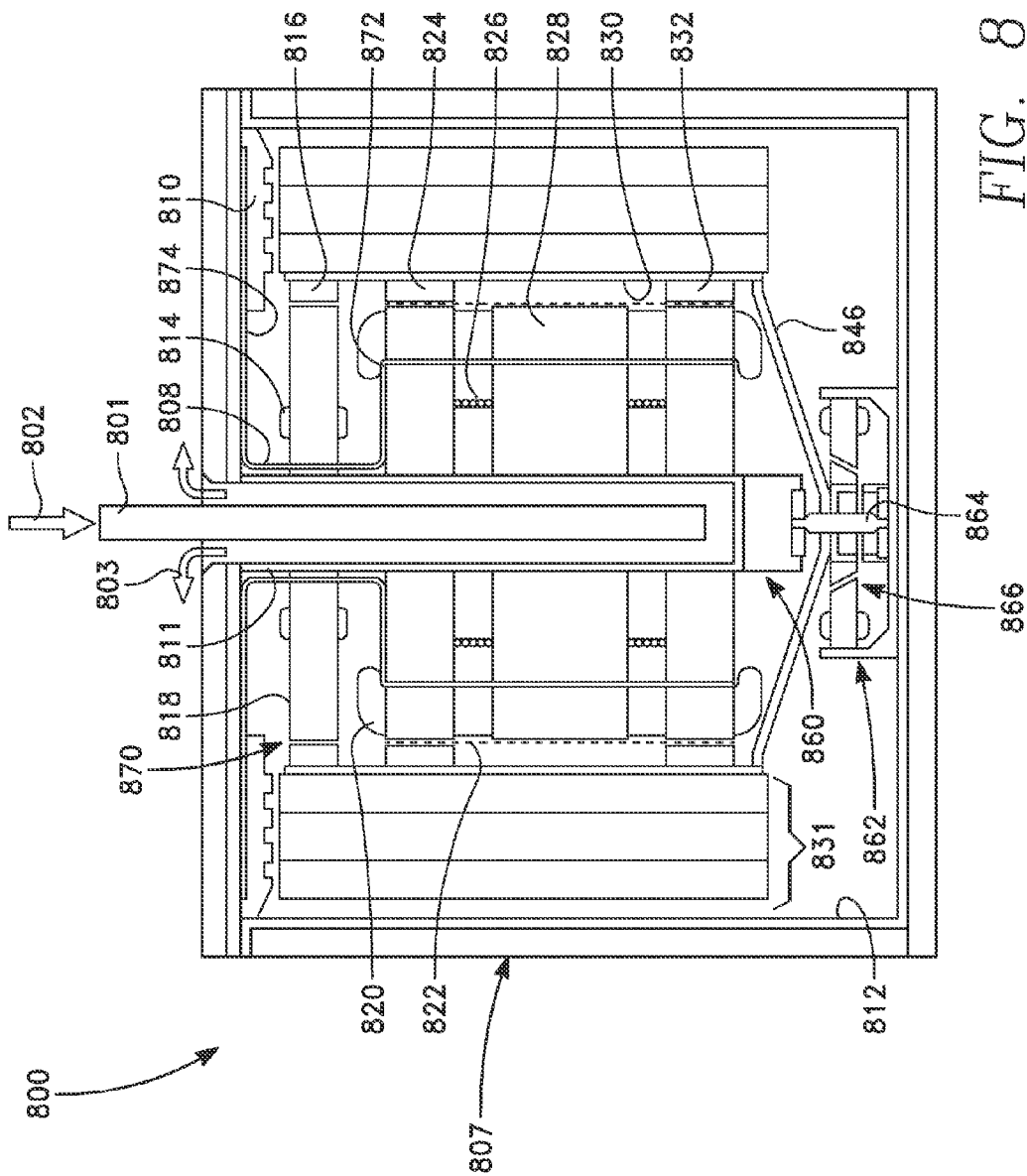
FIG. 8 shows a third embodiment of the electromechanical flywheel machine of FIG. 1.

FIG. 8 shows another embodiment of an electromechanical flywheel 800. A flywheel mass 831 surrounds and is coupled to a homopolar motor-generator rotor including a metallic liner 830. As shown, the rotor includes North rotor poles 824, 832. Not shown are the South rotor poles; see stages A and B of FIG. 5B for a similar arrangement that locates the South rotor poles.

A stator support 811 is coupled to a motor-generator stator 828 and each of field windings 826 and armature windings 820 are interengaged with the stator in a manner similar to that described above.

Supporting the rotor 830 and flywheel mass 831 is a hub 846 that is in turn supported by a support pin 864 engaging and/or located between upper and lower bearing carriers 860, 862. See FIGS. 6 and 7 for details of similar bearing carriers. A first electromagnetic bearing 866 is located in the lower bearing carrier. A second electromagnetic bearing 870 is spaced apart from the first and second bearing carriers and includes a bearing stator 818, a bearing rotor 818 and stator coils 814 for magnetizing the stator.

An electromechanical flywheel housing includes an inner vacuum barrier 812. In some embodiments, an outer housing 807 supports the vacuum barrier. Suitable vacuum barrier materials include stainless steel and other materials known by skilled artisans to be suited to this purpose.

In various embodiments, the stator support 811 has a tubular structure and a coaxial tube 801 is located therein. As shown, the coaxial tube envelops a liquid coolant flow entering the stator support 802 and an annulus between the support structure inside diameter and the coaxial tube outside diameter 815 provides a flow path for coolant leaving the stator support 803. Coolant traveling through the annulus absorbs heat from the stator 828 and is in various embodiments cooled in a cooler (not shown) before it is pumped (not shown) back into the flow entry 802.

Heat pipes 808 provide stator cooling in some embodiments. As shown, each of a plurality of heat pipes has a heat absorbing first end in close proximity to the stator, such as in the stator armature winding slots (as shown) 872. The heat rejecting end of the heat pipe is in close proximity to the vacuum barrier, such as in contact with vacuum barrier (as shown) 874 or in other embodiments cooled by the above mentioned liquid coolant flow.

As can be seen from the descriptions above, electromechanical flywheel 100 systems and structures, such as the cooling system 248 and the stator support 122, may have interrelated designs.

Containment systems 101 provide additional examples of interrelated designs. In various containment system embodiments, a plurality of interrelated structures provides one or more of structural support, a vacuum barrier, a projectile shield, fluid coolant passages, and heat transfer paths.

Figure 9A:
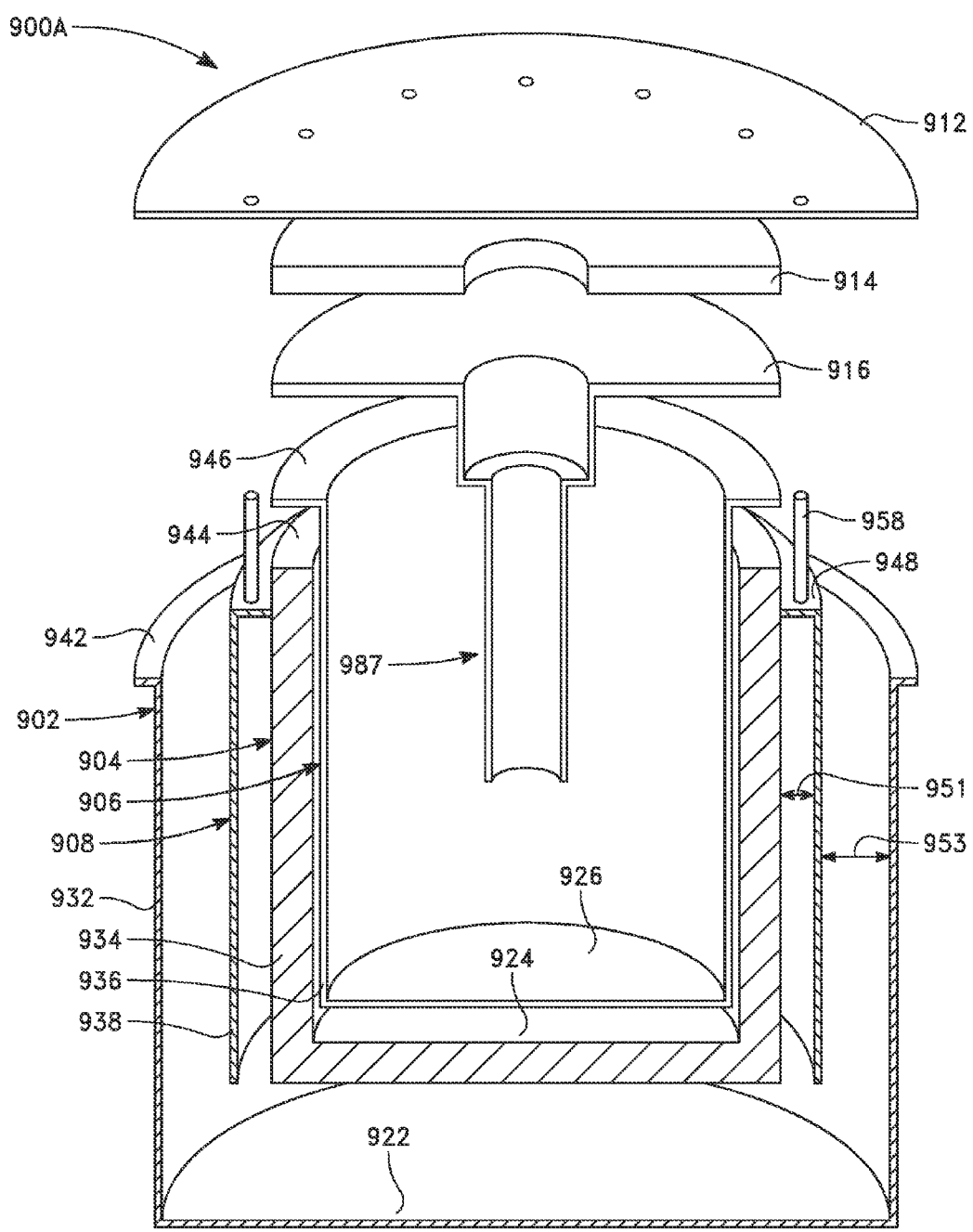
FIGS. 9A-C show containment systems of the electromechanical flywheel machine of FIG. 1.

FIG. 9A shows an exploded cross-sectional view of a multipurpose containment system 900A. The multipurpose containment system includes an inner enclosure 906 for providing a vacuum barrier, an intermediate enclosure 904 for providing a projectile shield, and an outer enclosure 902 for providing a fluid coolant passage. These and other features of the multiple enclosures are described in more detail below.

Inner enclosure 906 includes an inner cylindrical wall 936. An inner lid 916 is operable to close one end of the cylinder via a cylinder flange 946 and an inner floor 926 closes the cylinder's opposing end. As shown in this embodiment, a stator support 987 hangs from a central portion of the inner lid. The inner enclosure is made from a suitable vacuum sealing material such as metals, for example aluminum and/or stainless steel. Aluminum and stainless steel also promote a clean evacuated environment as they resist oxidation and the formation of contaminating particulates. In various embodiments, a clean evacuated environment promotes operation of vacuum pumps including drag pumps and promotes maintenance of a suitable vacuum pressure.

Intermediate enclosure 904 envelopes the inner enclosure 906. The intermediate enclosure includes an inner cylindrical wall 934. An intermediate lid 914 is operable to close one end of the cylinder such that the lid of the inner enclosure 916 is sealed between an end face of the intermediate cylinder 944 and the intermediate lid. An intermediate floor 924 closes the cylinder's opposing end. The intermediate enclosure is made from a suitable projectile shielding material such as metals, for example steel and/or steel alloys. A suitable material thickness is chosen taking into consideration the material used and the energy that must be absorbed during a selected design failure scenario(s).

While a gap is shown (for clarity) between the inner and intermediate enclosures 906, 904, embodiments with interference fits and/or a heat transfer compound therebetween enable heat transfer from one wall to the other. For example, heat radiated from a stator (see e.g., FIG. 8, 828) is transferred to the wall of the inner enclosure 936 and, absent a gap, via conduction to the wall of the intermediate enclosure 934.

Outer enclosure 902 envelops the intermediate enclosure 904. The outer enclosure includes an outer cylindrical wall 932. An outer lid 912 is operable to close one end of the cylinder via a cylinder flange 942 and an outer floor 922 closes the opposing end. The outer enclosure is made from a suitable coolant passage material such as metals, for example steel and/or steel alloys.

A flow divider shroud 908 includes a cylindrical shroud wall 938 for dividing the annulus between the intermediate wall 934 and the outer wall 932 into inner and outer annuli 951, 953. An end of the cylindrical shroud wall includes an inwardly directed sealing ring 948 for sealing between the cylindrical shroud wall and an adjacent structure such as the intermediate cylindrical wall 934, the inner lid 916, and/or the intermediate lid 914. One or more (two shown) coolant fluid exit conduits 958 penetrate the sealing ring and provide a means for exchanging fluid with the inner annular space 951. The shroud is made from a suitable coolant passage material such as metals and plastics. In an embodiment, the shroud is made from a plastic such as a high density polyethylene plastic or a polyvinyl chloride plastic.

Figure 9B:
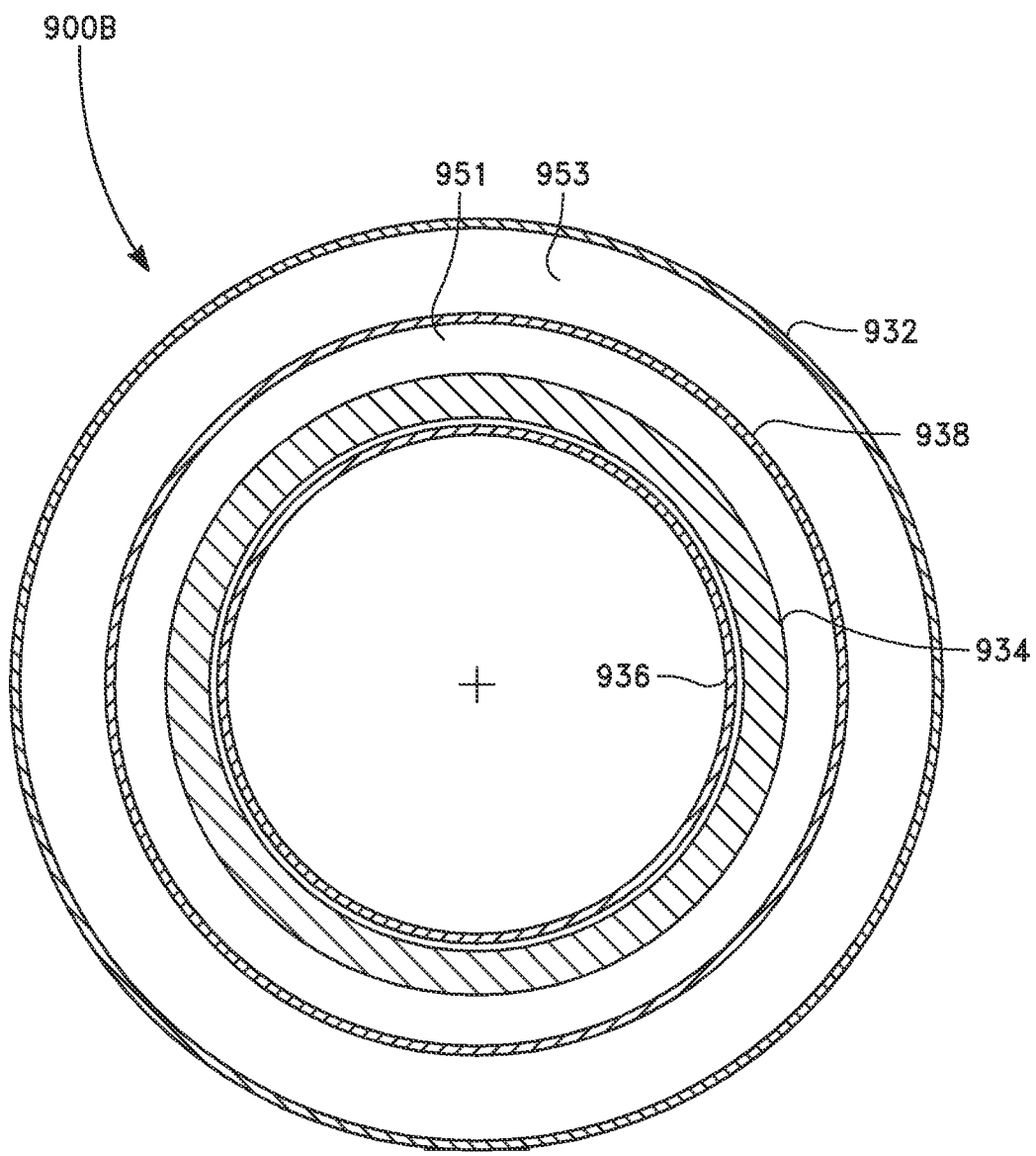

FIG. 9B shows a simplified cross-section 900B of the containment system of FIG. 9A. As seen, the inner wall 936 is encircled by the intermediate wall 934 and the intermediate wall is encircled by an outer wall 932. The outer wall encircles the shroud wall 938 and the shroud wall encircles the intermediate wall 934 such that the annulus between the intermediate and outer wall is divided into inner 951 and outer 953 annuli.

Figure 9C:
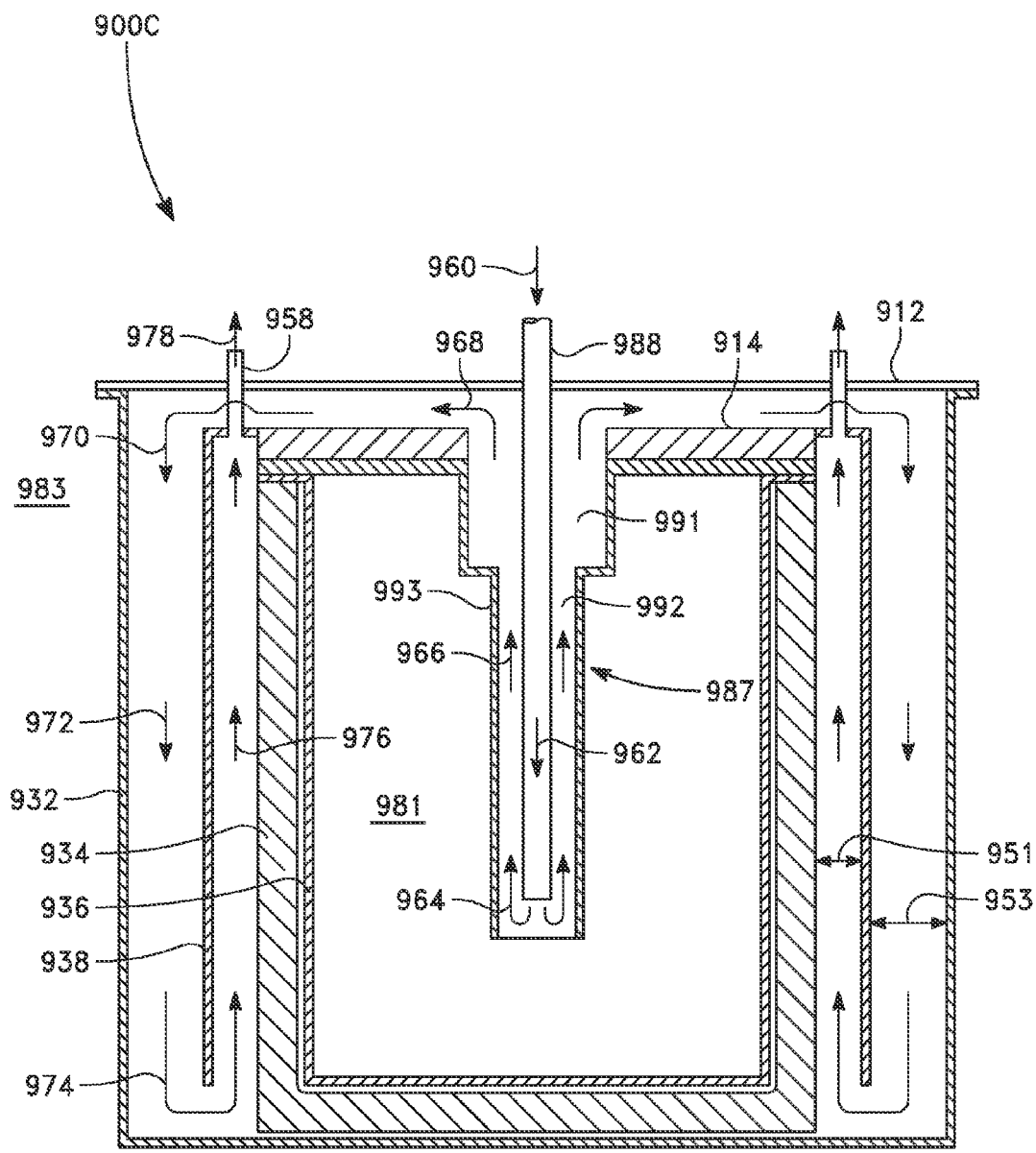

FIG. 9C shows the containment system of FIG. 9A after its assembly 900C. For clarity, flywheel internals including the stator 120, rotor 114, and flywheel mass are not shown. See FIG. 8 for exemplary flywheel internals.

During flywheel operation, heat is released within the inner enclosure flywheel space 981. In various embodiments, this heat is transferred to one or both of a fluid coolant (indicated by flow arrows) and to the surroundings 983. As the fluid coolant moves through the flow passages and elsewhere in the cooling system, heat is alternately absorbed by and rejected by the fluid coolant.

Coolant flow enters the containment system 960 via coolant entry conduit 988 that is inserted in a stator support central cavity 991 defining a stator support annular flow space 992. Flow from the entry conduit 962 empties into the annular flow space 964 where it absorbs heat transported to the stator support wall 993. Flow from the stator support annulus 966 is transported to a fluid plenum 968 between the outer lid 912 and the intermediate lid 914. Flow leaving the plenum 970 is transported to the outer annulus 953. In various embodiments, the coolant rejects heat to the surroundings 983 via heat transfer across the outer enclosure wall 932. Flow 972 from the outer annulus 953 is transported to the inner annulus 974. In various embodiments, the coolant absorbs heat via heat transfer across the intermediate and inner enclosure walls 934, 936. Flow 976 from the inner annulus 951 is transported to the fluid coolant exit conduit(s) 978.

In operation, a flywheel mass of the electromechanical flywheel is accelerated by the motor-generator during flywheel charging. During charging, energy is transferred to the motor-generator. During discharge, the motor-generator converts the kinetic energy of the flywheel into electrical energy as the flywheel mass is decelerated. Power electronics provide for conversion of network electric power in order to motor the motor-generator and the mechanically coupled flywheel mass. Power electronics also provide for conversion of motor-generator generated electric power into a waveform suited for use by the electrical network to which the electric power is transferred.

In operation, a containment system provides a projectile shield. For example, as shown in FIG. 9C, containment system 900C provides a projectile shield 906 should a failure such as a flywheel failure occur. In various embodiments: a vacuum barrier is provided by an inner enclosure 902 which enables vacuum maintenance in the flywheel space 981; a coolant flow space is provided by an outer enclosure 902; and, the coolant flow space is divided into inner and outer annular flow passages 951, 953 by a flow divider shroud 908. Heat absorbed by coolant flowing in the stator support 987 and heat absorbed by coolant flowing in the inner annular flow passage is rejected via one or both of heat transfer through the outer enclosure wall 932 to the environment 983 and heat transferred from the fluid external to the containment system such as via a fin-fan cooler (not shown).

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. An electromechanical flywheel containment system comprising:
   inner and outer enclosures defining respective inner and outer walls;
   a projectile shield between the walls of the inner and outer enclosures;
   an energy exchange block including
       a core assembly including a motor-generator stator and a stator support and
       a spinning assembly including a motor-generator rotor, a flywheel mass and a hub;
   the motor-generator rotor surrounding the motor-generator stator;
   the inner enclosure enveloping the energy exchange block;
   the outer enclosure enveloping the inner enclosure;

a first annular flow passage for transporting a fluid coolant, the first annular flow passage outer diameter bounded by a wall of the outer enclosure; and, wherein a containment system fluid circuit for transporting coolant includes the first annular flow passage and a stator support flow passage.

2. The electromechanical flywheel containment system of claim 1 further comprising:

the inner and outer walls of the inner and outer enclosures concentrically arranged;

the projectile shield encircling the inner wall;

a shroud encircling the projectile shield;

the shroud encircled by the outer wall of the outer enclosure;

the first annular flow passage inner diameter bounded by the shroud;

a second annular flow passage bounded by the shroud and the projectile shield; and, wherein the containment system fluid circuit for transporting coolant includes the second annular flow passage.

3. An electromechanical flywheel containment system comprising:

inner and outer enclosures defining respective inner and outer walls:

a projectile shield between the inner and outer walls;

an annular flow passage for transporting a fluid coolant;

the annular flow passage inner diameter bounded by the projectile shield;

a motor-generator stator hanging from the inner enclosure;

a rotating assembly
including a motor-generator rotor,
defining an axis of rotation, and
encircling a motor-generator stator and defining an axis of rotation;

a flywheel mass surrounding and coupled to the rotor; and, wherein a field winding of the stator encircles the axis of rotation and an armature winding of the stator does not encircle the axis of rotation.

4. An electromechanical flywheel containment system comprising:

inner and outer enclosures defining respective inner and outer walls;

the inner enclosure operable to provide a vacuum barrier;

a projectile shield between the walls of the inner and outer enclosures;

an energy exchange block including
a core assembly including a motor-generator stator and a stator
support and
a spinning assembly including a motor-generator rotor, a flywheel mass and a hub;

the motor-generator rotor surrounding the motor-generator stator;

the inner enclosure enveloping the energy exchange block;

the outer enclosure enveloping the inner enclosure;

a first annular flow passage for transporting a fluid coolant, the first annular flow passage outer diameter bounded by a wall of the outer enclosure; and, wherein a containment system fluid circuit for transporting coolant includes the first annular flow passage and a stator support flow passage.

* * * * *